(No Model.) 6 Sheets—Sheet 3.
G., J. G. & M. O. REHFUSS.
APPARATUS FOR MANUFACTURING HAIR PINS.
No. 573,536. Patented Dec. 22, 1896.
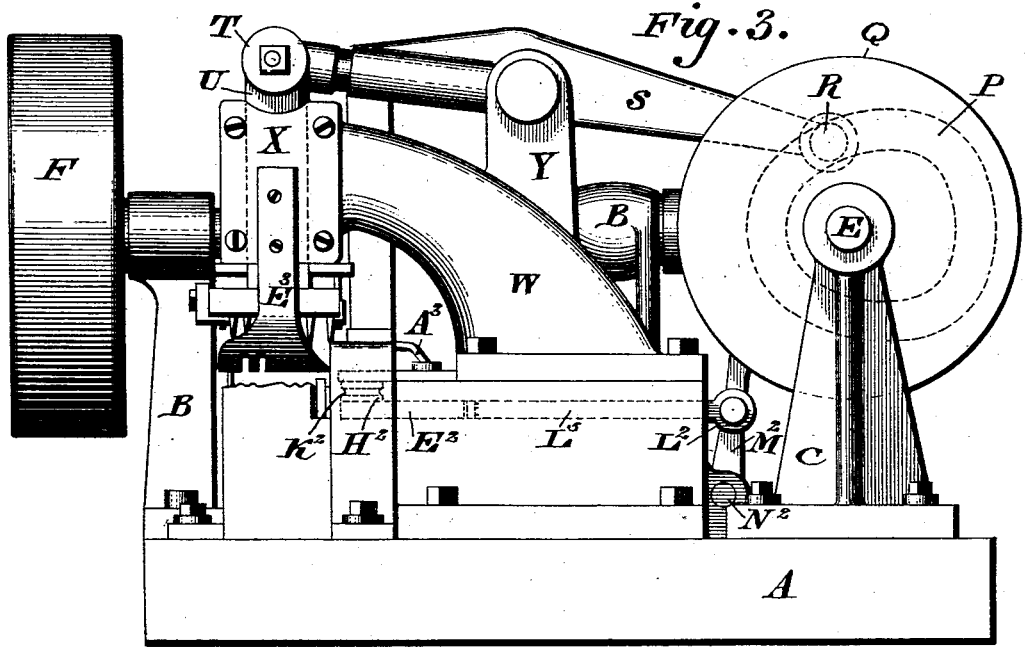
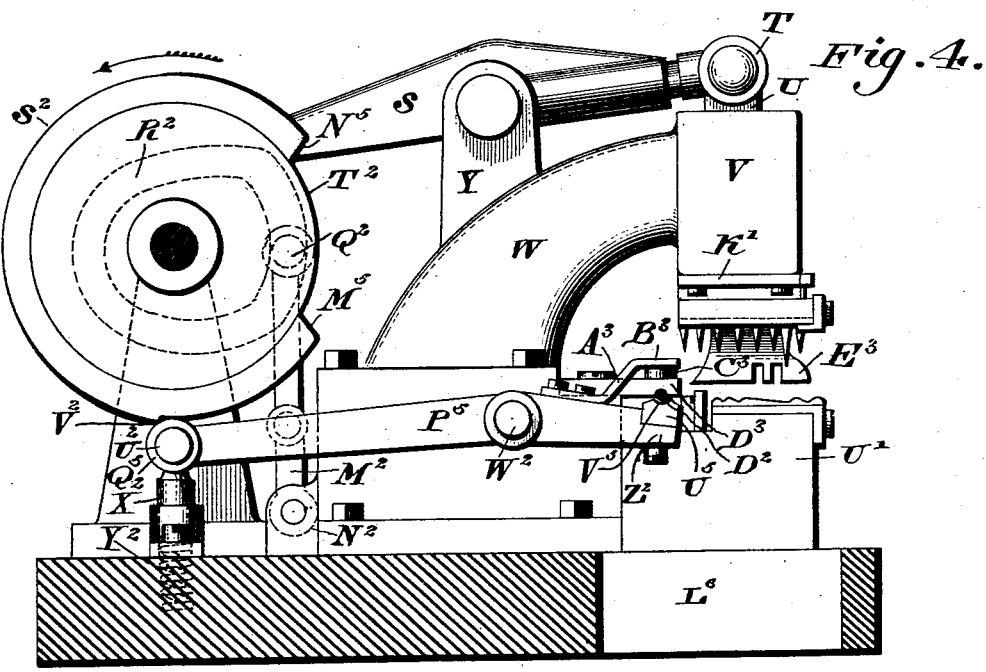

(No Model.)                                    6 Sheets—Sheet 4.
G., J. G. & M. O. REHFUSS.
APPARATUS FOR MANUFACTURING HAIR PINS.
No. 573,536.                     Patented Dec. 22, 1896.
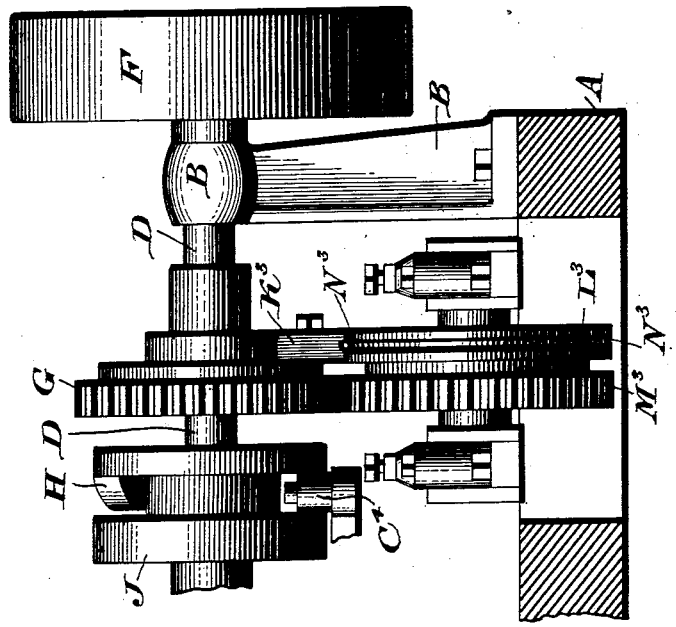
Witnesses
P. F. Nagle.
L. Douville.
Inventors
George Rehfuss
John George Rehfuss
Martin O. Rehfuss
By their Attorney
Joshua Wiesenheim

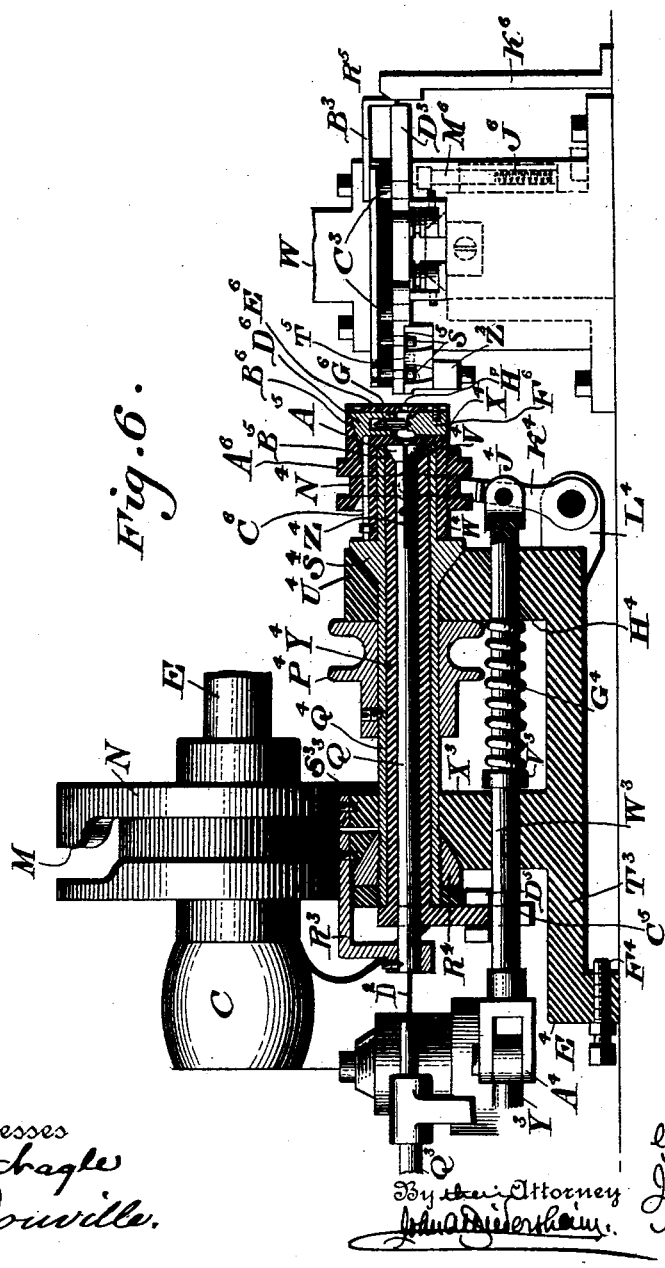

(No Model.) 6 Sheets—Sheet 6.
G., J. G. & M. O. REHFUSS.
APPARATUS FOR MANUFACTURING HAIR PINS.
No. 573,536. Patented Dec. 22, 1896.
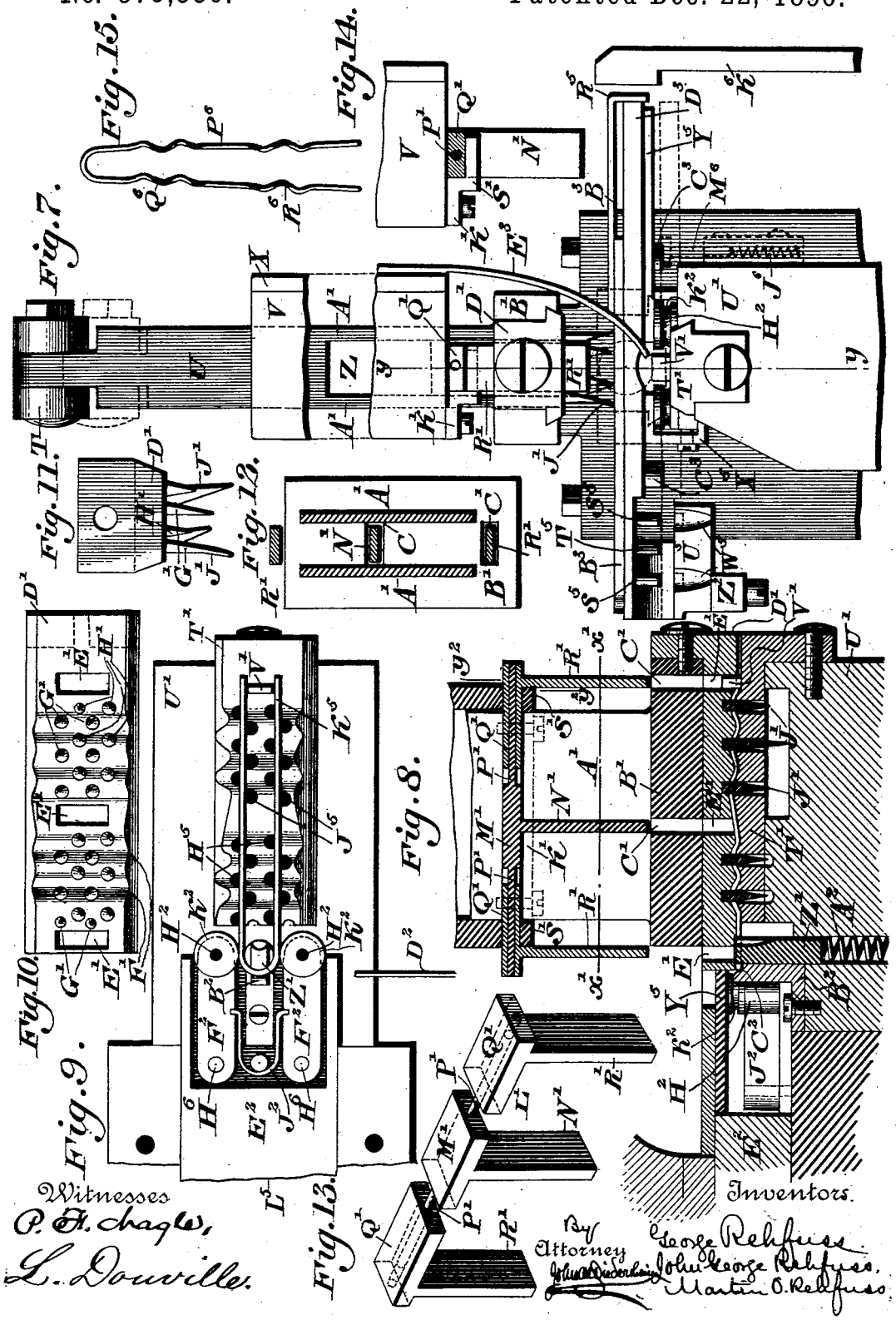

UNITED STATES PATENT OFFICE.

GEORGE REHFUSS, JOHN GEORGE REHFUSS, AND MARTIN O. REHFUSS, OF PHILADELPHIA, PENNSYLVANIA, ASSIGNORS TO CLINTON C. HANCOCK, OF SAME PLACE.

APPARATUS FOR MANUFACTURING HAIR-PINS.

SPECIFICATION forming part of Letters Patent No. 573,536, dated December 22, 1896.

Application filed September 17, 1894. Serial No. 523,206. (No model.)

*To all whom it may concern:*

Be it known that we, GEORGE REHFUSS, JOHN GEORGE REHFUSS, and MARTIN O. REHFUSS, citizens of the United States, residing in the city and county of Philadelphia, State of Pennsylvania, have invented a new and useful Improvement in Apparatus for Manufacturing Hair-Pins, which improvement is fully set forth in the following specification and accompanying drawings.

Our invention consists of improvements in apparatus for manufacturing hair-pins which have a limb provided with coils, a portion of said limb having its convolutions in one direction, while another portion of the said limb has its convolutions in a reversed direction, and a guiding portion extending between said coils, as disclosed in Letters Patent granted to Walter F. Peet, No. 395,582, dated January 1, 1889, the wire being measured, cut off, and pointed, bent into U shape, and finally given the above-described reversely-inclined convolutions and the pin finally discharged from the machine, the above steps being performed mechanically and automatically, all as will be hereinafter set forth.

The invention further consists of novel details of construction, all as will be hereinafter set forth, and specifically pointed out in the claims.

Figure 1:
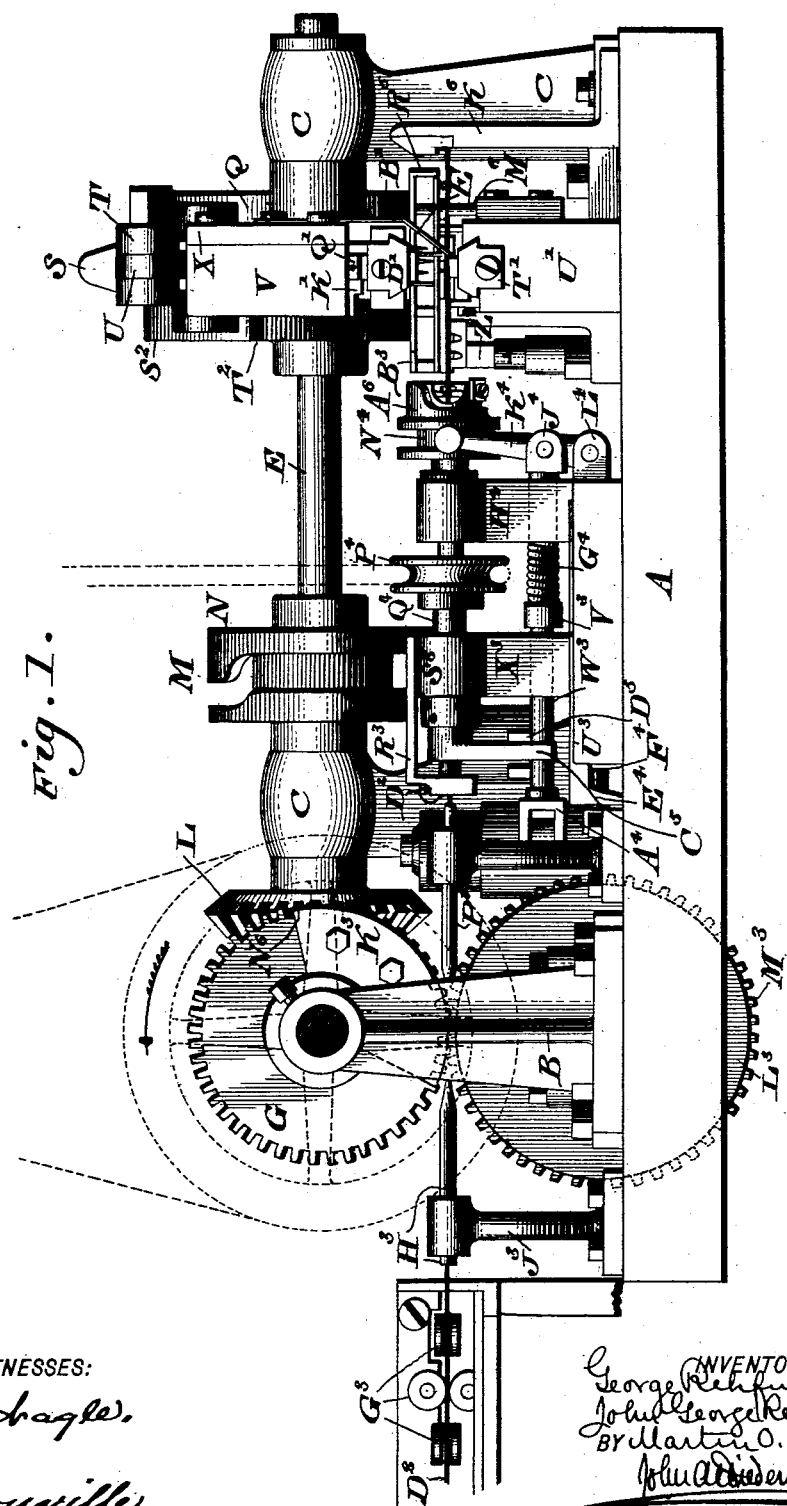
Figure 2:
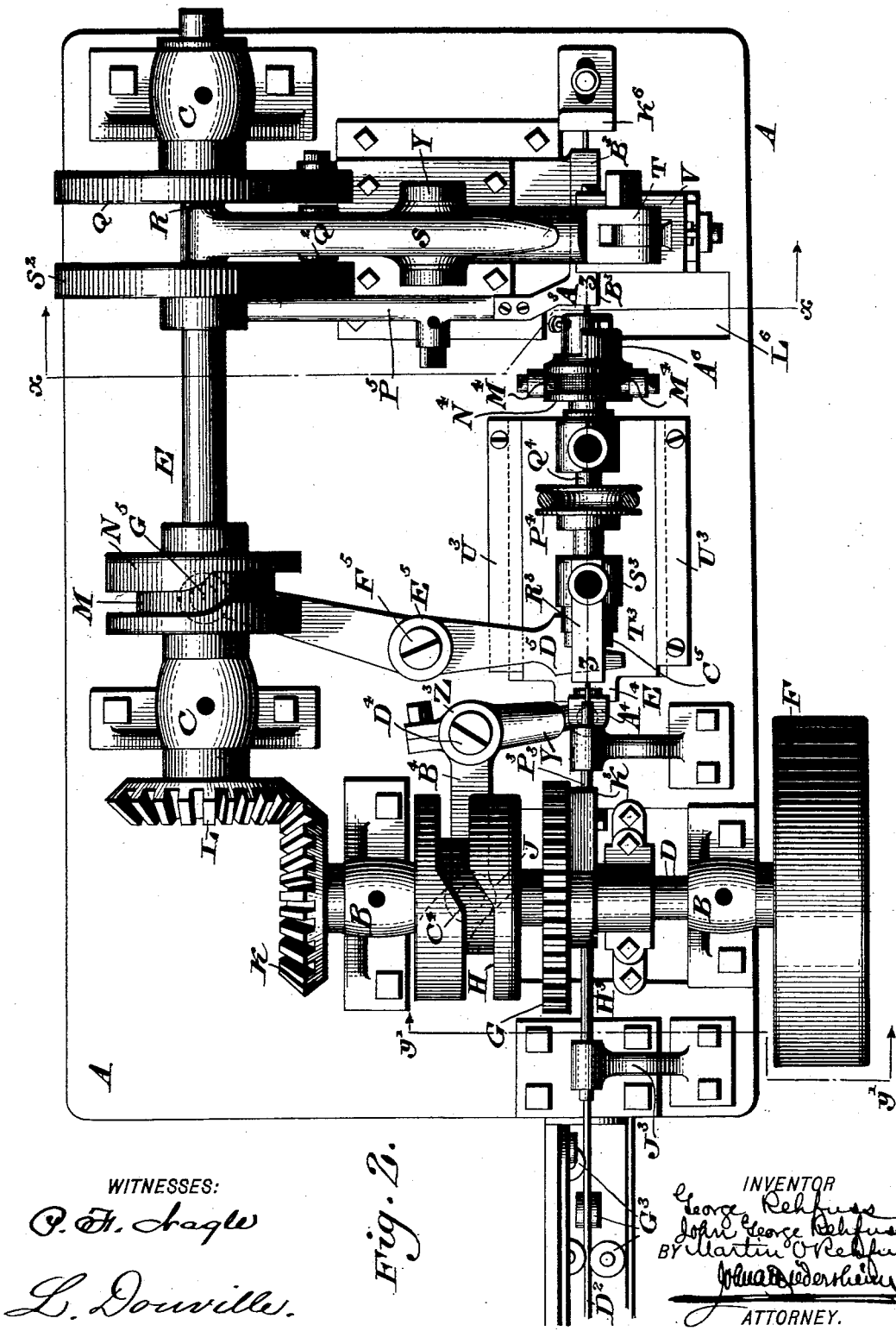

Figure 1 represents a side view of a machine for manufacturing hair-pins embodying our invention. Fig. 2 represents a plan view of the same. Fig. 3 represents a view of the right-hand end of Fig. 1. Fig. 4 represents a section on line $x\,x$, Fig. 2, viewed in the direction of the arrows. Fig. 5 represents a section on line $y'\,y'$, Fig. 2, viewed in the direction of the arrows, showing the wire-feeding mechanism. Fig. 6 represents, on an enlarged scale, a section on line $z\,z$, Fig. 2. Fig. 7 represents, on an enlarged scale, a front view of the upper and lower dies and their adjuncts, &c. Fig. 8 represents a section on line $y\,y$, Fig. 7, but showing the dies contacting with each other. Fig. 9 represents a plan view of the lower die and mechanism for giving the wire the initial bend. Fig. 10 represents a plan view of the upper die. Fig. 11 represents an end view of Fig. 10. Fig. 12 represents a section on line $x'\,x'$, Fig. 8. Fig. 13 represents a perspective view of the stripper detached. Fig. 14 represents a section on line $y^2\,y^2$, Fig. 8. Fig. 15 represents a plan view of a finished hair-pin.

Similar letters of reference indicate corresponding parts in the several figures.

Referring to the drawings, A designates the bed of the machine, and B B and C C designate standards suitably attached thereto, in the upper portions of which are journaled the shafts D and E.

F designates a belt-pulley, G a gear-wheel, and H a cam-groove in the cam-wheel J.

K designates a bevel-gear mounted on the said shaft D, said gear meshing with a similar gear L, mounted on the shaft E. M designates the cam-groove of a cam-wheel N, mounted on the said shaft E, and P designates the cam-groove in the side of the cam-wheel Q, a stud R entering said groove, said stud being secured to one end of a rocking lever S, which is pivotally mounted about midway its ends in the standard Y. U designates a plunger which is pivotally mounted in the head T of said lever S, said plunger moving vertically in the head V of the arm W, which is suitably attached to the bed A. X designates a side of said head V, which in the present instance is made removable and has attached thereto the flexible bent plate $E^3$, which throws the pins to one side as they are pushed from the upper die.

The lower portion of the plunger U is slotted or recessed at Z, as seen in Figs. 7 and 8, and A' designates the sides of the same. The head B' of said plunger is solid, but has the slots C', which in the present instance are two in number, the object of which will be made evident.

D' designates the upper die, which is secured to the head B' in any suitable manner and is provided with the openings E', which register with the slots C'.

The working face of the die D' is provided with a series of shallow transverse grooves F', as seen in Figs. 8 and 10, and G' G' and H' H', Fig. 10, designate two rows of pins, the pins in each row being arranged staggered in relation to the pins in an adjacent row, all the said pins G' and H', however, in their respective rows being arranged in substantially parallel longitudinal lines, as is best seen in Fig. 10, the bases of said pins being secured in the said upper die in the inclined portions of the transverse grooves in every instance, so that the longitudinal space between any two adjacent pins will always embrace either the deepest or the highest portion of one of the transverse grooves in the face of said upper die, certain of the pins nearest the front of the die being prolonged for a purpose to be referred to. The ends J' of the two rows of pins G' are bent in the same direction, in the present case to the left, and the ends of the two rows H' are bent in the opposite direction, in the present instance to the right, as seen in Figs. 7, 10, and 11, so that when the upper die descends and contacts with the lower one, if a hair-pin $K^5$ be thereon, it will be seen that each leg of the same will be engaged by the pins G' and H', the points of the same being bent, so that their bodies do not come in contact with the wire until they have entered the holes $H^5$ and $J^5$ in the lower die, the latter having transverse grooves and ridges to correspond with the contour of the upper die.

K' designates an angle-shaped bracket which is secured to the head V and has the portion S', which holds the stripper L' tightly against the bottom thereof, as seen in Fig. 14, said stripper being employed to push the hair-pins off from the upper die as the latter ascends. The said stripper is shown in detail in Fig. 13 and consists of the body-piece M', having the downwardly-depending leg or blade N'. P' designates pins or studs which extend from each end of said body-piece and enter similar body-pieces Q', which have the downwardly-depending legs R'. The parts are shown in operative position in Fig. 8 especially, and it will be noticed that the legs R' are adjustable laterally to allow dies of different lengths to be used, the openings C' C' in the head B' being made somewhat wider in practice than herein shown.

T' designates the lower die, which is secured to the bed U' in any suitable manner and has a projection V', which is directly under the end slots E' and C', the object of said projection being to keep the ends of the pin at a proper distance apart as the same is bent into a U shape, and to also assist in shaping the pin, as is evident from Figs. 8 and 9, the working face of said die T' being provided with the transverse grooves and the staggered holes in the sides thereof, the deepest portions of said die T' being directly under the highest portions of the upper die D', and the ends J' of the pins therein being vertically over the holes $H^5$ and $J^5$, as has already been stated.

$L^6$ designates an opening in the bed-plate A, adjacent the bed or anvil U', through which the pins are discharged into a suitable receptacle below. Z' designates a plunger which is vertically movable in a hole in the rear of said bed U', and $A^2$ designates a spring thereunder, said plunger normally extending upwardly a short distance above the upright portion $C^2$ of the angle-piece $B^2$, which is suitably secured to the bed U', said upper end $C^2$ being preferably shaped as shown in Fig. 8 for the reception of the wire $D^2$, which is shown in Fig. 9 in the act of being fed between said end $C^2$ and the plunger Z', the latter being depressed by the upper die when the same reaches the bottom of its stroke.

$E^2$ designates the front end of a reciprocating bar $L^5$, said front end having a recess in which are pivotally secured at $H^6$ the links $F^2$ $F^2$, which have journaled in their front ends the rollers $H^2$, which are kept in proper position in the present instance by their contact with the sides of said recess, which is effected by means of the U-shaped spring $J^2$, the ends of which engage the links $F^2$, as seen in Fig. 9.

$K^2$ designates grooves in the periphery of the rollers $H^2$, whereby the wire is held in position while being bent into U shape, as shown in Fig. 9.

The end $L^2$ of the said bar $L^5$ is pivotally attached to a rod $M^2$ at a point intermediate the ends of the latter, as shown in Fig. 3, said rod $M^2$ having its lower end pivotally attached to a suitable fixed point $N^2$, while its upper end carries a stud $Q^2$, which is actuated by means of the inside cam-groove $R^2$ of the cam-wheel $S^2$. The periphery of said wheel $S^2$ is recessed at $T^2$, $M^5$ and $N^5$, Fig. 4, designating the extent of said recess. $V^2$ designates another working face or incline on said cam-wheel $S^2$, the radius of the short arc $V^2$ $M^5$ being obviously less than the greatest radius of said wheel.

The end $U^2$ of the lever $P^5$ is provided with a suitable antifriction-roller $Q^5$, which is always kept in contact with the periphery of the cam-wheel $S^2$ by means of the plunger $X^2$, which is placed thereunder and rests on the spring $Y^2$. The lever $P^5$ is fulcrumed at $W^2$, and it will be seen that the revolution of the cam-wheel $S^2$ in the direction of the arrow will impart to the end $Z^2$ of said lever two substantially vertical movements of varying extent, the object of which will be made evident. Near said end $Z^2$ of the lever $P^5$ is secured the angle-shaped piece $A^3$, which has a horizontal lateral extension $B^3$, which is located behind the dies and which may be made in sections and has its extreme right-hand end $R^5$ turned downwardly. $C^3$ designates two pins attached to the under side of said extension $B^3$, which pass through openings in the stationary plate $D^3$, which is secured to a suitable portion of the bed A.

$M^6$ designates a plunger which rests on a spring $J^6$, inclosed in a casing, the head of said plunger bearing against the end of the right-hand pin $C^3$, as seen in Fig. 6, so that the upward movement of the plate or extension $B^3$ is always assured at the proper times.

K⁶ designates an adjustable stop adjacent the bed U⁷. To the under side of the left-hand end of the said extension B³ are attached the pins S⁵ S⁵ and T⁵, the latter pin being set a little behind the other two, which are in line, so as to form guides for the wire D² before the same is depressed by the pins C³ to the level of the grooves K² in the rollers H² prior to being bent into U shape, as in Fig. 9.

U⁵ designates a block which is attached to the end Z² of the lever P⁵, the said block having in its upper surface a groove V⁵, corresponding to a similar groove in the under side of the stationary plate D³, so that the wire at certain times will be tightly gripped therebetween. W⁵ designates grooves in front of said block U⁵, which allow the pins S⁵ to enter therein.

The rolls H² are journaled in a suitable frame X⁵, the upper portion Y⁵ of which is extended to the right, as seen in Fig. 7, the same being removed in Fig. 9 for convenience of illustration, the office of the same being to assist in moving and guiding the wire before it is first bent into U shape.

Referring now to Figs. 1 and 2 especially, G³ designates rollers over and between which the wire D² is fed, which after leaving the same passes into the guide H³, the same consisting of a hollow tube supported in the stand J³. K³ designates a sector-shaped plate which is attached to a side of the gear G, the arc portion of which at times contacts with the periphery of the disk L³ when the parts are in the positions shown in Figs. 1 and 5. The said disk L³ is attached to a side of the gear M³, which meshes with the gear G, said gear M³ being suitably journaled and the disk and sector being in the same vertical plane. N³ designates a groove in the periphery of said sector and disk, and when the wire is fed thereinto from the guide H³ and the arcs are in contact, as seen in Fig. 1, the wire will be fed along into and through the guide P³, which is suitably attached to the bed A, and thence it passes into the hollow spindle Q³, which is kept from turning by means of a set-screw in the arm R³, the latter being attached to the top S³ of the upright portion X³ of the stand T³, the latter being capable of longitudinal movement in the ways U³, the movement in one direction being caused by the engagement of the shoulder V³ of the rod W³ with the upright portion X³ of said stand T³, said rod being actuated by means of the pivotal connection of the arm Y³ of the bell-crank Z³ with the knuckle A⁴ on the end of said rod W³, the other arm B⁴ of said bell-crank having a stud C⁴ therein engaging the walls of the cam H, as seen in Fig. 2, said bell-crank Z³ turning freely on the stud D⁴. The left-hand end of the stand T³ has a downwardly-turned portion E⁴, in which is the threaded bolt F⁴, which can be locked in any desired position in the usual manner. G⁴ designates a spring one end of which abuts against the shoulder V³, while the other end is in contact with the other vertical portion H⁴ of the stand or frame T³, and it will be seen that a movement of the rod W³, Fig. 6, to the left will cause a like movement of the stand T³, the extent of said movement being determined by the throw given to the bell-crank Z³ by the cam H, while the stand's movement to the right is caused by the contacting of the spring G⁴ with the upright portion H⁴, said movement being limited by the contact of the bolt F⁴ with some suitable fixed point, which may be a crossbar (not shown) connecting the guides U³ U³, an additional longitudinal movement of the rod W³, which passes freely through the uprights X³ and H⁴, being permissible by reason of the compression of the spring G⁴, as is evident. J⁴ designates the right-hand end of the rod W³, which after passing through the upright H⁴ is pivotally connected with the lever K⁴, one end of which is pivotally attached to the ear L⁴ on the stand T³, the other end of said lever being forked and having the inwardly-projecting studs M⁴ M⁴, whose ends engage the sides of the groove N⁴ of the sleeve A⁶, which may have a portion of its right-hand end cut away, as seen in Figs. 1 and 2 especially.

Referring now to Fig. 6 especially, P⁴ designates a pulley which is mounted on and secured to the sleeve Q⁴, so that the latter revolves therewith, said sleeve having in the portion S³ the adjustable cone-shaped bearing R⁴ for the purpose of taking up wear, the conical bearing S⁴ in the top portion U⁴ not being adjustable. The said sleeve Q⁴ has an extension V⁴ projecting to the right beyond the bearing S⁴ and has secured thereto the cylindrical shell W⁴, one end X⁴ of which is closed, except for an opening in the middle, and thus incloses the end of said extension V⁴ and also the end of the sleeve Y⁴, which does not revolve and forms a bearing for the outer sleeve Q⁴, said sleeve Y⁴ resting upon and inclosing the aforesaid hollow spindle Q³, through which passes the wire D². Z⁴ designates a longitudinal split near the end of said spindle Q³, the end of the latter being made flaring or cone-shaped at A⁵, while the adjacent end B⁵ of the inclosing sleeve Y⁴ is beveled to correspond. The left-hand end of said sleeve has the depending arm C⁵, which is forked, so as not to interfere with the movement of the rod W³, and is engaged by the bifurcated end D⁵ of the lever E⁵, which is fulcrumed at F⁵, the other end having a stud G⁵, which is engaged and actuated by the sides of the cam M, as shown in Fig. 2. The cylindrical shell W⁴ has a longitudinal spline C⁶ immovably attached thereto, which enters a longitudinal slot in the sleeve A⁶, thus forming a guide and a bearing therefor, as shown in Fig. 6. The said sleeve A⁶ has also an inclined portion B⁶, which is adapted to ride upon a similar inclined face of the movable block D⁶, in which is journaled the cutter E⁶, which has its cutting edge V-shaped, so that the wire is simultaneously cut and sharpened or pointed. $F^6$ designates an immovable block having a groove therein corresponding to the cutting edge of the cutter $E^6$, and $G^6$ designates a bar over the end of the device, said bar having an opening for the passage of the wire therethrough, as has also the closed end $X^4$ of the cylindrical shell $W^4$, it being obvious that the parts $A^6$, $D^6$, $F^6$, and $G^6$ may be assembled in any suitable manner, it only being required that the block $D^6$, carrying the cutter $E^6$, be capable of being moved to and from the block $F^6$ by the engagement of the inclined face $B^6$ of the sleeve $A^6$ thereinto as said sleeve is reciprocated back and forth on the spline $C^6$.

The operation is as follows: Referring to Fig. 1, first suppose the sector $K^3$ to be revolved in the direction of the arrow until the point $N^6$ contacts with the wire $D^2$, which is being fed through the guides $H^3$ and $P^3$ to the right, and at the same time the edge $M^5$ of the recess $T^2$ of the cam-wheel $S^2$, Fig. 4, which revolves in the direction of the arrow, contacts with the roller $Q^5$ of the lever $P^5$, depressing the same and raising the end $Z^2$ into the position seen in Fig. 4, the upper portion of the block $U^5$ being nearly in contact with the wire $D^2$, which is now between the stationary plate $D^3$ and said block $U^5$. At about this instant the rolls $H^2$, Figs. 3 and 9, begin to be moved forward by means of the connections shown particularly in Figs. 3 and 4 and bend the length of wire which has been already cut off and depressed to a point in front of said rolls into the U shape shown in said Fig. 9. At about this instant the upper die is caused to descend into the position shown in Fig. 8, and it will be evident that the transverse grooves in the faces of the said dies will give to each limb of the pin a curvature in one direction, while the engagement of the rows of pins $G'$ and $H'$, whose ends are turned outwardly, as seen in Fig. 11, with the limbs of the pin, the pins being arranged staggered in relation to each other, as shown in Fig. 10, will give the limbs a curvature in another direction, the result being the production of a pin $P^6$, as seen in Fig. 15, a portion of a limb of said pin having its convolutions inclined in one direction, as $Q^6$, while another portion of the same limb $R^6$ has its convolutions in a reversely-inclined direction, as described in Patent No. 395,582, above referred to. The pin having been bent into the shape described, the upper die rises, and the pin is pushed therefrom by the legs $N'$ and $R'$ of the stripper $L'$, Fig. 13, which is stationary, the said stationary legs passing through the slots $C'$ in the head $B'$ as the latter ascends, (see Fig. 8,) while the device $E^3$ guides the pins as they fall down through the opening $L^6$, Fig. 4. At or about the instant the upper die begins to descend the bell-crank $Z^3$, Fig. 2, is moved by its cam, thereby moving the rod $W^3$, Figs. 1 and 6, to the right, and by means of the spring $G^4$ and the shoulder $V^3$ and the other connections the stand $T^3$ is moved to the extreme right as far as the bolt $F^4$ will permit, carrying with it the sleeve $A^6$ and its adjuncts, and when the same have reached this point the forked end $D^5$ of the lever $E^5$, Fig. 2, engages the depending arm $C^5$ and moves to the right the internal sleeve $Y^4$, whereby the split ends $A^5$ of the hollow spindle $Q^3$ are pressed together by reason of the contact of the cone-shaped ends thereof, which slide on each other, Fig. 6, and will tightly pinch the wire $D^2$ therebetween. At this instant that portion of the wire between the plate $D^3$ and block $Z^2$ is tightly gripped by the engagement of the inclined portion $V^2$ of the cam-wheel $S^2$ with the roller $Q^5$, Fig. 4, the latter movement being shown in said figure in the act of taking place. The wire is now gripped tightly on each side of the cutter $E^6$, Fig. 6, and, the pulley $P^4$ constantly revolving, further movement of the rod $W^3$ to the right causes the sleeve $A^6$ to move in the same direction, and by reason of the inclined faces in contact at $B^6$ the block $D^6$, carrying the cutter $E^6$, will be moved toward the block $F^6$, simultaneously cutting off and pointing the wire, the proper length of the same having been measured off by means of the stop $K^6$, the bent end $R^5$ of the extension $B^3$ assisting to guide the wire when the latter is depressed, and the sector or feeding device $K^3$ is now in about the position seen in Fig. 5. The proper length of wire having been cut off, and the upper die having made its descent and ascent, and the bar $L^5$, carrying the rollers $H^2$, having been moved to its extreme rear position, the plate or extension $B^3$ is caused to descend into the position shown in Fig. 7, the edge $N^5$ of the recess $T^2$, Fig. 4, having now reached the roller $Q^5$, the cam-wheel $S^2$ revolving in the direction of the arrow. The spring $Y^2$ forces upwardly the end $U^2$ of the lever, thereby depressing the extension $B^3$, as stated, thereby carrying the wire $D^2$, which has just been cut off to the proper length, downwardly to a level with the groove $K^2$ in the rolls $H^2$, the pins $C^3$ engaging the same, and the wire being held in its proper position by means of the staggered pins $S^5$ $S^5$ and $T^5$, Fig. 6. At this instant the bar $L^5$ moves forward, carrying its rollers $H^2$, which bend the wire which has just been passed between the points $B^2$ and $Z'$, Fig. 9, into the U shape, the ends being kept at the proper distance apart by the projection $V'$. At about this instant the upper die descends and the pin is compressed into the shape shown in Fig. 15, as has been already described. As the upper die descends the stand $T^3$ is moved to the right, the wire is gripped on both sides of the cutter, as has been explained, and at substantially the same instant the rolls $H^2$ begin to move backward and reach their extreme back position just before the upper die ascends, it being remembered that when the wire is being cut it is above said rolls, and the latter begin to move forward just as the plate $B^3$ is depressed, carrying down the length of wire which has been cut off, the initial downward movement of the upper die being substantially simultaneous with the initial backward movement of the rolls H². After the wire has been cut the continued revolutions of the cams, &c., return the stand T³ and the parts carried thereby to their left-hand position, the spring G⁴ assisting somewhat in the return movement. The wire is bent into horseshoe shape at about the same time the stand T³ and its adjuncts move to the right, and the spring-pressed plunger M⁶ assists in rendering the upward movement of the plate B³ more positive.

It will of course be understood that hairpins of different sizes may be manufactured by the above-described machine by altering the dies and adjusting the other parts of the machine according to requirements, and it will further be evident that hair-pins of the usual U shape may be given the reversely-inclined convolutions described by compressing them between the dies shown in Figs. 9 and 10, and we do not therefore desire to limit our invention to the successive operations of the several parts of the machine in every instance.

It is of course obvious that the various functions of the several parts hereinbefore referred to—viz., the feeding, cutting, and pointing, depressing, bending, and shaping the wire—may take place at slightly-different intervals in relation to each other than has been described, and it is also evident that modifications or changes may be made, such as may suggest themselves to the skilled mechanic, which will come within the scope of our invention, and we do not therefore desire to be limited to the exact constructions we have herein shown and described.

Having thus described our invention, what we claim as new, and desire to secure by Letters Patent, is—

1. In a machine for manufacturing hair-pins, having limbs provided with convolutions reversely inclined to each other, a set of dies provided with grooves and ridges, the grooves of one die being in alinement with the ridges of the other die, one of said dies having pins therein arranged in staggered order, and the other of said dies being recessed for the reception of said pins, in combination with means for supporting and actuating said dies.

2. In a machine for manufacturing hair-pins, having limbs provided with convolutions reversely inclined to each other, a pair of dies having transverse grooves and ridges therein, the grooves of one die being in alinement with the ridges of the other die, one of said dies having pins therein arranged in staggered order, and the other of said dies having holes therein for the reception of said pins.

3. The herein-described adjustable stripper consisting of the body portions, legs depending therefrom, and means for moving said legs toward or away from each other.

4. In a machine for manufacturing hair-pins provided with convolutions reversely inclined to each other, the combination of mechanism for feeding a wire, with mechanism for cutting, pointing and bending said wire into substantially a U shape, and a pair of dies, having on the working faces thereof, means for bending said wire in one plane, and devices for bending said wire in another plane, but in reverse direction.

5. In a machine for manufacturing hair-pins, having limbs provided with convolutions reversely inclined to each other, a feeding device for the wire, means for cutting, pointing and bending the same, and dies having transverse grooves, and pins and holes for compressing the limbs of the wire into convolutions reversely inclined.

6. In a machine for manufacturing hair-pins, having limbs provided with convolutions reversely inclined to each other, dies for forming convolutions reversely inclined, provided with transverse grooves, pins in the upper die located in staggered relation to said grooves, so that the longitudinal space between any two adjacent pins always embraces either the highest or the deepest part of the said die, the lower die being provided with holes for the reception of the pins, and means for actuating one of the said dies.

7. In a machine for manufacturing hair-pins, having limbs provided with convolutions reversely inclined to each other, dies provided with transverse grooves, pins in the upper die arranged relatively to the grooves, and bent substantially as shown, the lower die having holes therein for the reception of said pins, when the dies contact with each other, and a stripper for removing the pins from the face of said upper die, said parts being combined.

8. In a machine for manufacturing hair-pins, having limbs provided with convolutions reversely inclined to each other, the herein-described stripper, comprising the central body portion M' having the depending leg N', and the pins P' in combination with the body-pieces Q', which have the holes for the reception of said pins and the depending legs R'.

9. In a machine for manufacturing hair-pins, having limbs provided with convolutions reversely inclined to each other, the stripper L' constructed as shown, in combination with the head V' and the plunger U having the slot Z and the head B', the latter having the apertures C' therein, and means for holding said stripper in position.

10. In a machine for manufacturing hair-pins, having limbs provided with convolutions reversely inclined to each other, the feeding device comprising the sector K³, the disk L³, and means for actuating the same, the stand T³ supporting the hollow spindle or stem Q³, having one of its ends split and beveled as shown, the sleeve Y⁴ having the arm R⁴, the outer sleeve Q⁴ and the bearing therefor, said sleeve Q⁴ being adapted to be revolved and to carry thereon the longitudinally-movable sleeve $A^6$, the block $F^6$ and the cutter $E^6$ suitably journaled, and means for moving the stand $T^3$, the arm $R^4$ and sleeve $A^6$.

11. In a machine for manufacturing hairpins, having limbs provided with convolutions reversely inclined to each other, means for cutting off a predetermined length of wire, a cutting device, devices for gripping the wire on each side of said cutting device at the proper intervals, the plate $B^3$ having the pins $C^3$ for depressing said wire to a point adjacent to the bending device, the reciprocating bar $L^5$ carrying the rolls $H^2$ for bending said wire, the stationary piece $B^2$ and the spring-pressed plunger $Z'$ for holding the wire.

12. In a machine for manufacturing hairpins, having limbs provided with convolutions reversely inclined to each other, the gears G and $M^3$, the sector $K^3$ and disk $N^3$ attached thereto respectively, the cam-wheels J, N, $S^2$ and Q, having grooves therein, means for actuating the same in unison, the bell-crank $Z^3$, the lever $E^5$, suitable connections therefrom to the device for cutting and pointing the wire, the levers $P^5$, S and $M^2$, and connections therefrom to the devices for bending and compressing the wire, the above parts being combined.

13. In a machine for manufacturing hairpins, having limbs provided with convolutions reversely inclined to each other, the gears G and $M^3$ having the sector $K^3$ and disk $N^3$ attached thereto respectively, the cam-wheels J, N, $S^2$ and Q, having cam-grooves therein, means for actuating the same, the bell-crank $Z^3$, the lever $E^5$, suitable connections therefrom to the device for cutting and pointing the wire, the levers $P^5$, S and $M^2$, and connections therefrom to the devices for bending the wire, the above parts being combined.

14. In a machine for manufacturing hairpins, having limbs provided with convolutions reversely inclined to each other, the herein-described apparatus for holding and bending a predetermined length of wire, comprising the stationary device $B^2$ having its end $C^2$ recessed as shown, the plunger $Z'$ adjacent thereto, the reciprocating bar $L^5$ carrying thereon the rolls $H^2$, $H^2$ suitably journaled to movable plates thereon, the spring $A^2$, means for supporting the same in position, the die or bed having the projection $V'$ thereon, and means for actuating said bar $L^5$, said parts being combined.

15. In a machine for manufacturing hairpins, having limbs provided with convolutions reversely inclined to each other, the upper and lower dies constructed substantially as shown, having the transverse grooves, and the slots, pins and holes therein, in combination with an adjustable stripper consisting of body portions and legs, the distance between the latter being capable of being varied at will.

16. In a machine for manufacturing hairpins, having limbs provided with convolutions reversely inclined to each other, a slotted plunger, means for actuating the same, a die attached to said plunger, a second die thereunder, devices on the abutting faces of said dies for imparting reversely-inclined convolutions to the article compressed therebetween, and a stationary sectional stripper held in the slot of said plunger.

17. In a machine for manufacturing hairpins, having limbs provided with convolutions reversely inclined to each other, means for cutting off a predetermined length of wire, means for propelling the same to a bending device, and mechanism for bending the lengths of wire into U shape, thereby forming a hair-pin, in combination with a set of dies having grooves and ridges on their abutting faces, and pins and holes common to said faces, whereby a limb of said hair-pin is provided with convolutions reversely inclined to each other.

18. In a machine for manufacturing hairpins, having limbs provided with convolutions reversely inclined to each other, means for feeding the wire, and cutting off a predetermined length of the same, means for gripping the said wire on each side of the cutter prior to the action of the latter, said means comprising the hollow spindle $Q^3$ suitably supported and having one end split and the beveled head $A^5$, the sleeve $Y^4$ having the depending arm $C^5$ at one end, and the bevel or incline at the other end, and the outer sleeve $Q^4$, in combination with the stationary plate $D^3$ and the lever $P^5$ carrying the block $U^5$, means for actuating the same, and means for shaping the wire.

19. In a machine for manufacturing hairpins, having limbs provided with convolutions reversely inclined to each other, the movable stand $T^3$ and rod $W^3$ having a shoulder $V^3$ and spring thereon, the outer rotatable sleeve $Q^4$ having an extension carrying the cylindrical shell $W^4$, the latter having a spline and a sliding sleeve thereon, a stationary block secured to the end of said sleeve, a movable block also arranged adjacent thereto, and having a cutter journaled therein, the adjacent faces of said movable block and inclined sleeve being inclined, in combination with means for moving said sleeve and for shaping and compressing the wire, said parts being combined.

20. In a machine for manufacturing hairpins, having limbs provided with convolutions reversely inclined to each other, means for feeding, cutting off and pointing a predetermined length of wire, and means for transferring the latter to the bending mechanism, the same comprising the lever $P^5$ suitably fulcrumed, and the lateral extension-plate $B^3$ attached thereto, the pins $C^3$ depending therefrom, the stationary plate $D^3$, openings therein for said pins, means for actuating said lever, and means for finally shaping the wire, the above parts being combined.

21. In a machine for manufacturing hairpins having limbs provided with convolutions reversely inclined to each other, mechanism for cutting off and pointing a predetermined length of wire, a device for bending said wire into U shape, thereby forming a hair-pin, and mechanism for propelling said length of wire toward said device, in combination with a set of dies having their abutting faces provided with raised and depressed portions, one of said dies having pins arranged in staggered order, and the other die being provided with holes for the reception of said pins, whereby convolutions reversely inclined to each other are produced upon a limb of said hair-pin.

22. In a machine for manufacturing hairpins, provided with convolutions reversely inclined to each other, the combination of mechanism for feeding a wire with mechanism for cutting said wire, and bending it into substantially a U shape, and a pair of dies, having on the working faces thereof, means for bending said wire in one plane, and devices for bending said wire in another plane but in reverse direction.

23. In a machine for manufacturing hairpins, having limbs provided with convolutions reversely inclined to each other, a pair of dies having on the working faces thereof, alining corrugations for bending a wire in one plane, and also devices for bending said wire in another plane but in reverse direction.

24. In a machine for manufacturing hairpins, having limbs provided with convolutions reversely inclined to each other, a single pair of dies, having on the working faces thereof, means for bending wire in one plane, and also devices for bending said wire in another plane but in reverse direction in combination with means for actuating one of said dies.

GEORGE REHFUSS.
JOHN GEORGE REHFUSS.
MARTIN O. REHFUSS.

Witnesses:
JOHN A. WIEDERSHEIM,
E. H. FAIRBANKS.